US010728965B1

(12) United States Patent
Shum

(10) Patent No.: US 10,728,965 B1
(45) Date of Patent: Jul. 28, 2020

(54) STROBE DEVICE AND CHARGING CONTROL METHOD THEREFOR

(71) Applicant: NISSIN INDUSTRIES LTD., North Point, Hong Kong (CN)

(72) Inventor: Tak Wah Shum, Hong Kong (CN)

(73) Assignee: NISSIN INDUSTRIES LTD., Hong Kong (CN)

(*) Notice: Subject to any disclaimer, the term of this patent is extended or adjusted under 35 U.S.C. 154(b) by 0 days.

(21) Appl. No.: 16/790,856

(22) Filed: Feb. 14, 2020

(30) Foreign Application Priority Data

Feb. 19, 2019 (JP) .................................. 2019-027626

(51) Int. Cl.
  *H05B 41/34* (2006.01)
  *G05F 1/445* (2006.01)
  *H01M 2/10* (2006.01)
  *H02J 7/00* (2006.01)

(52) U.S. Cl.
  CPC ............ *H05B 41/34* (2013.01); *G05F 1/445* (2013.01); *H01M 2/1022* (2013.01); *H02J 7/007182* (2020.01)

(58) Field of Classification Search
  CPC ........ H05B 41/34; H05B 41/32; H05B 41/30; G03B 7/0807; G03B 15/05; G03B 2215/05; G03B 2215/0517; G03B 2215/0532; H02M 3/33507
  See application file for complete search history.

(56) References Cited

U.S. PATENT DOCUMENTS

| 5,678,077 | A | * | 10/1997 | Ichikawa | ............... G03B 15/05 396/156 |
| 6,584,286 | B2 | * | 6/2003 | Odaka | .................. H05B 41/325 396/206 |
| 7,443,141 | B2 | * | 10/2008 | Ichimasa | ................ G03B 15/05 320/166 |
| 10,426,019 | B2 | * | 9/2019 | Saito | ...................... H05B 41/30 |

FOREIGN PATENT DOCUMENTS

JP   2003295280   10/2003
JP   2006058482   3/2006

* cited by examiner

*Primary Examiner* — Haissa Philogene
(74) *Attorney, Agent, or Firm* — Dority & Manning, P.A.

(57) ABSTRACT

A strobe device includes: a battery case configured to hold a plurality of batteries; a main capacitor charged by the batteries; a flash discharge tube to which a voltage is applied by the main capacitor; a voltage detecting unit configured to detect a voltage of each of the batteries, respectively; and a charging control unit configured to control charging of the main capacitor such that the main capacitor is charged with a first electric current that is suitable for lithium batteries in a case where a total voltage of the batteries detected by the voltage detecting unit is more than a prescribed first value, and control charging of the main capacitor such that the main capacitor is charged with a second electric current that is greater than the first electric current in a case where the total voltage is equal to or less than the first value.

9 Claims, 5 Drawing Sheets

STROBE DEVICE AND CHARGING CONTROL METHOD THEREFOR

CROSS REFERENCE TO RELATED APPLICATIONS

This application claims priority to Japanese Patent Application No. 2019-027626, having a filing date of Feb. 19, 2019, which is incorporated herein by reference.

TECHNICAL FIELD

The present invention relates to a strobe device and a charging control method therefor, and particularly to a strobe device and a charging control method therefor that can use a plurality of batteries in a replaceable manner.

BACKGROUND ART

A known strobe device for a camera includes an internal power supply and an external power supply as power supplies for charging a main capacitor that applies a voltage to a flash discharge tube. In this strobe device, charging speed of the main capacitor is switched depending on whether only the internal power supply is used or both the internal power supply and the external power supply are used (see JP2003-295280A). Another known strobe device sets a charging electric current of the main capacitor based on a temperature of the battery (see JP 2006-58482A).

A columnar lithium battery, which is substantially the same size as an alkaline battery and a nickel-metal hydride battery in an AA size, is commercially available as a battery used for a strobe device in a replaceable manner. Rated voltages of the alkaline battery and the nickel-metal hydride battery are 1.5V to 1.2V, while a rated voltage of the lithium battery is 3.7V. That is, the rated voltage of the lithium battery is more than twice as high as the rated voltages of the alkaline battery and the nickel-metal hydride battery.

As the lithium battery has a higher rated voltage than the alkaline battery and the nickel-metal hydride battery, a charging speed of the main capacitor when the lithium battery is used is preferably lower than that of the main capacitor when the alkaline battery or the nickel-metal hydride battery is used so that a battery with a long life can be provided.

SUMMARY OF THE INVENTION

In view of such a problem of the prior art, a primary object of the present invention is to provide a strobe device and a charging control method therefor that can selectively use multiple types of batteries with different rated voltages and charge the main capacitor at a charging speed suitable for each type of the battery.

To achieve such an object, one embodiment of the present invention provides a strobe device (10) including: a battery case (20) configured to hold a plurality of batteries (100) formed in a substantially same size in a replaceable manner; a main capacitor (44) charged by the batteries (100); a flash discharge tube (46) to which a voltage is applied by the main capacitor (44); a voltage detecting unit (62) configured to detect a voltage of each of the batteries (100), respectively; and a charging control unit (60) configured to control charging of the main capacitor (44) such that the main capacitor (44) is charged with a first electric current that is suitable for lithium batteries in a case where a total voltage of the batteries (100) detected by the voltage detecting unit (62) is more than a prescribed first value and a difference in the voltage between the batteries is equal to or less than a prescribed value, and control charging of the main capacitor (44) such that the main capacitor (44) is charged with a second electric current that is greater than the first electric current in a case where the total voltage is equal to or less than the first value.

According to this arrangement, when multiple types of batteries (100) with different rated voltages are selectively used, the main capacitor (44) can be charged at a charging speed suitable for each type of the battery (100).

Preferably, in the strobe device (10), the charging control unit (60) is configured to control charging of the main capacitor (44) such that the main capacitor (44) is charged with the first electric current in a case where the total voltage is more than the first value, the difference in the voltage between the batteries is equal to or less than the prescribed value, and the voltages of all the batteries (100) detected by the voltage detecting unit (62) are less than a prescribed second value that is smaller than the first value, and prohibit charging of the main capacitor (44) in a case where the total voltage is more than the first value and the voltage of at least one of the batteries (100) detected by the voltage detecting unit (62) is not less than the second value.

According to this arrangement, it is possible to prevent the main capacitor (44) from being charged by the battery (100) that is in an overcharged state.

Preferably, in the strobe device (10), the charging control unit (60) is configured to control charging of the main capacitor (44) such that the main capacitor (44) is charged with the first electric current in a case where the total voltage is more than the first value, the difference in the voltage between the batteries is equal to or less than the prescribed value, and the voltages of all the batteries (100) detected by the voltage detecting unit (62) are equal to or more than a prescribed third value that is smaller than the second value, and prohibit charging of the main capacitor (44) in a case where the total voltage is more than the first value and the voltage of at least one of the batteries (100) detected by the voltage detecting unit (62) is not equal to or more than the third value.

According to this arrangement, it is possible to prevent the main capacitor (44) from being charged by the battery (100) that is in an over-discharged state.

Preferably, the strobe device (10) further includes a temperature detecting unit (63) configured to detect a temperature of each of the batteries (100), respectively, wherein the charging control unit (60) is configured to allow charging of the main capacitor (44) in a case where the temperatures of all the batteries (100) detected by the temperature detecting unit (63) are equal to or less than a prescribed temperature, and prohibit charging of the main capacitor (44) in a case where the temperature of at least one of the batteries (100) detected by the temperature detecting unit (63) is not equal to or less than the prescribed temperature.

According to this arrangement, it is possible to prevent the main capacitor (44) from being charged by the battery (100) at a temperature inappropriate for charging the main capacitor (44).

Preferably, the strobe device (10) further includes a printed circuit board (22) provided with the voltage detecting unit (62) and the charging control unit (60), wherein temperature sensors (64, 66, 68, 70) that constitute the temperature detecting unit (63) are mounted on the printed circuit board (22) for each of the batteries (100) held by the battery case (20).

According to this arrangement, the temperature detecting unit (63) for each of the batteries (100) can be constituted easily.

Preferably, the strobe device (10) further includes a printed circuit board (22) provided with the voltage detecting unit (62) and the charging control unit (60), wherein the temperature detecting unit (63) includes: temperature sensors (64, 66, 68, 70) mounted on the printed circuit board (22) for each of the batteries (100) held by the battery case (20); and temperature sensing elements (80) corresponding to each of the temperature sensors (64, 66, 68, 70) and abutting against an outer circumferential face of each of the batteries (100).

According to this arrangement, the temperature of each of the batteries (100) is reliably detected.

Preferably, in the strobe device (10), the batteries (100) to be held in the battery case (20) include the lithium batteries, nickel-metal hydride batteries, and alkaline batteries.

According to this arrangement, any of the lithium batteries, the nickel-metal hydride batteries, and the alkaline batteries can be selectively used as the battery (100) for the strobe device (10). Accordingly, a choice of the battery (100) can be increased, and the strobe device (10) can be more convenient.

Preferably, in the strobe device (10), the charging control unit (60) is configured to prohibit charging of the main capacitor (44) in a case where the total voltage is more than the first value and the difference in the voltage between the batteries (100) is more than the prescribed value.

To achieve such an object, one embodiment of the present invention provides a charging control method of the strobe device (10) that includes a battery case (20) configured to hold a plurality of batteries (100) in a replaceable manner, a main capacitor (44) charged by the batteries (100), and a flash discharge tube (46) to which a voltage is applied by the main capacitor (44). The charging control method includes steps of: detecting a voltage of each of the batteries (100), respectively; and charging the main capacitor (44) with a first electric current that is suitable for lithium batteries in a case where a total voltage of the batteries (100) is more than a prescribed first value, and charging the main capacitor (44) with a second electric current that is greater than the first electric current in a case where the total voltage is equal to or less than the first value.

According to this arrangement, when multiple types of batteries (100) with different rated voltages are selectively used, the main capacitor (44) can be charged at a charging speed suitable for each type of the battery (100).

Thus, according to one embodiment of the present invention, it is possible to provide a strobe device and a charging control method therefor that can selectively use multiple types of batteries with different rated voltages and charge the main capacitor at a charging speed suitable for each type of the battery.

DESCRIPTION OF THE PREFERRED EMBODIMENT(S)

In the following, a strobe device 10 according to one embodiment of the present invention will be described with reference to FIG. 1 to FIG. 5.

Figure 1:
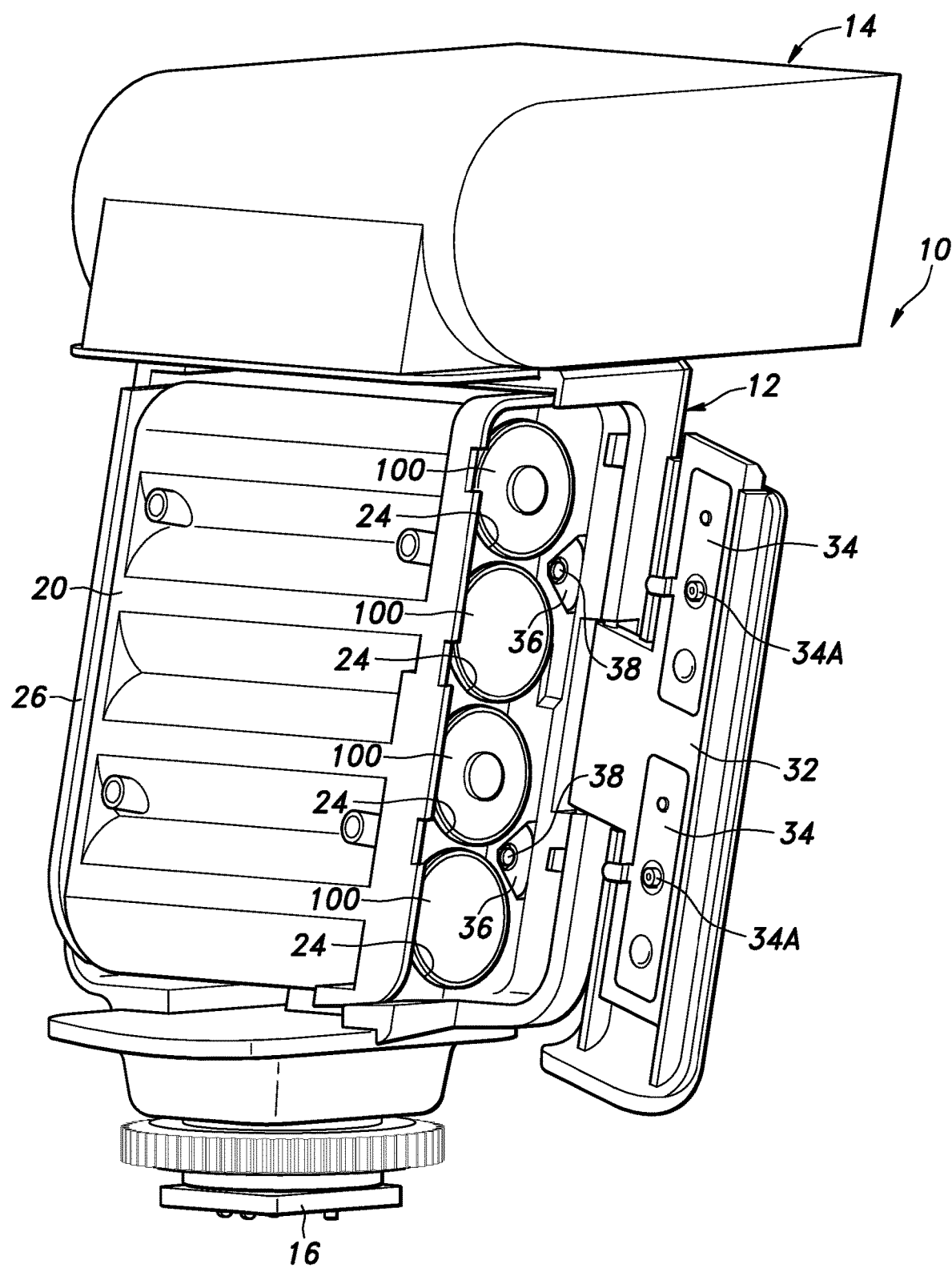
FIG. 1 is a perspective view of a strobe device according to one embodiment of the present invention.
Figure 2:
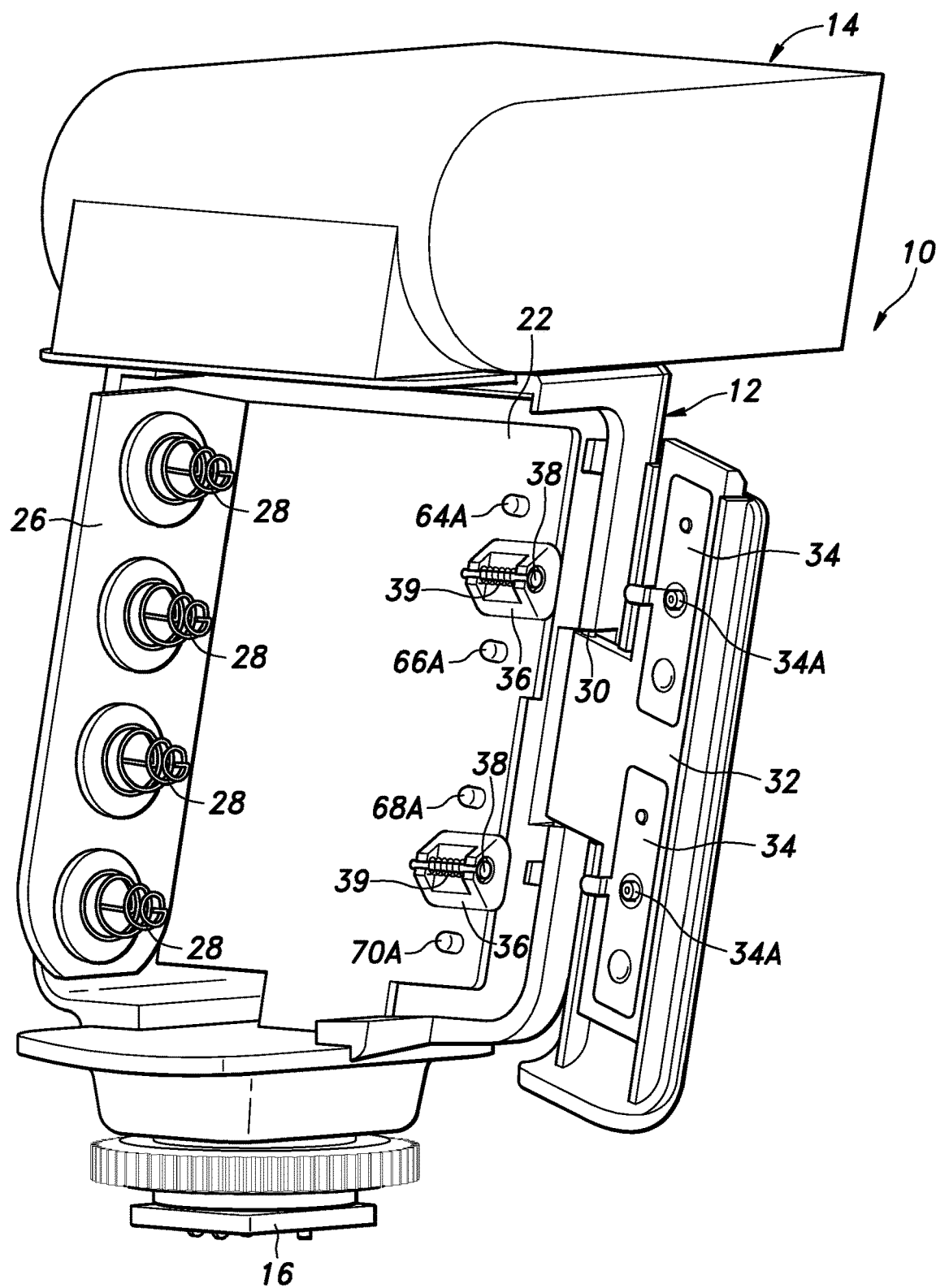
FIG. 2 is a perspective view of the strobe device in a state where a battery case is removed according to the one embodiment.

As shown in FIG. 1 and FIG. 2, the strobe device 10 includes a power housing 12 and a flash housing 14 provided on an upper portion of the power housing 12. A mounting portion 16 for mounting the strobe device 10 on a camera (not shown) is provided at a lower part of the power housing 12.

The power housing 12 contains a battery case 20 and a printed wiring board 22 (printed circuit board) for power supply. The battery case 20 has four battery chambers 24 aligned up and down. Each battery chamber 24 is defined by a columnar space (cylindrical space), and respectively holds (accommodates) an AA size battery 100 with a columnar shape (cylindrical shape) in a detachable manner. That is, each battery chamber 24 holds the battery 100 having substantially the same size (outer size) in a replaceable manner. The battery 100 to be held in each battery chamber 24 is, for example, a rechargeable lithium battery, a rechargeable nickel-metal hydride battery, or an alkaline battery in the AA size or substantially the same size as the AA size.

A terminal mounting plate 26 disposed on one side of the battery case 20 is attached to an inside of the power housing 12. Four terminals 28 that respectively correspond to each battery chamber 24 are mounted on the terminal mounting plate 26. Each terminal 28 is electrically connected to the printed wiring board 22, respectively.

A lid plate 32 is attached to a side portion of the power housing 12 via a hinge 30 in an openable and closable manner. The lid plate 32 is disposed on the other side of the battery case 20 (the side opposite to the terminal mounting plate 26). Two terminal plates 34 are mounted on the lid plate 32. Each terminal plate 34 is commonly used for two adjacent battery chambers 24. Two pin holders 36 are mounted on the printed wiring board 22. Each pin holder 36 slidably supports a contact pin 38. Each contact pin 38 is biased toward each terminal plate 34 by a spring 39. One end of each contact pin 38 is electrically connected to a connection portion 34A of each corresponding terminal plate 34 in a state where the lid plate 32 is closed. Each contact pin 38 functions as an intermediate tap (relay point) for detecting a voltage of each battery 100 held in each battery chamber 24, and is electrically connected to the printed wiring board 22 via a spring 39. The spring 39 may abut against each contact pin 38 in an electrically connected state. One winding end of the spring 39 may be extended, and connected electrically and directly to the printed wiring board 22.

Figure 3:
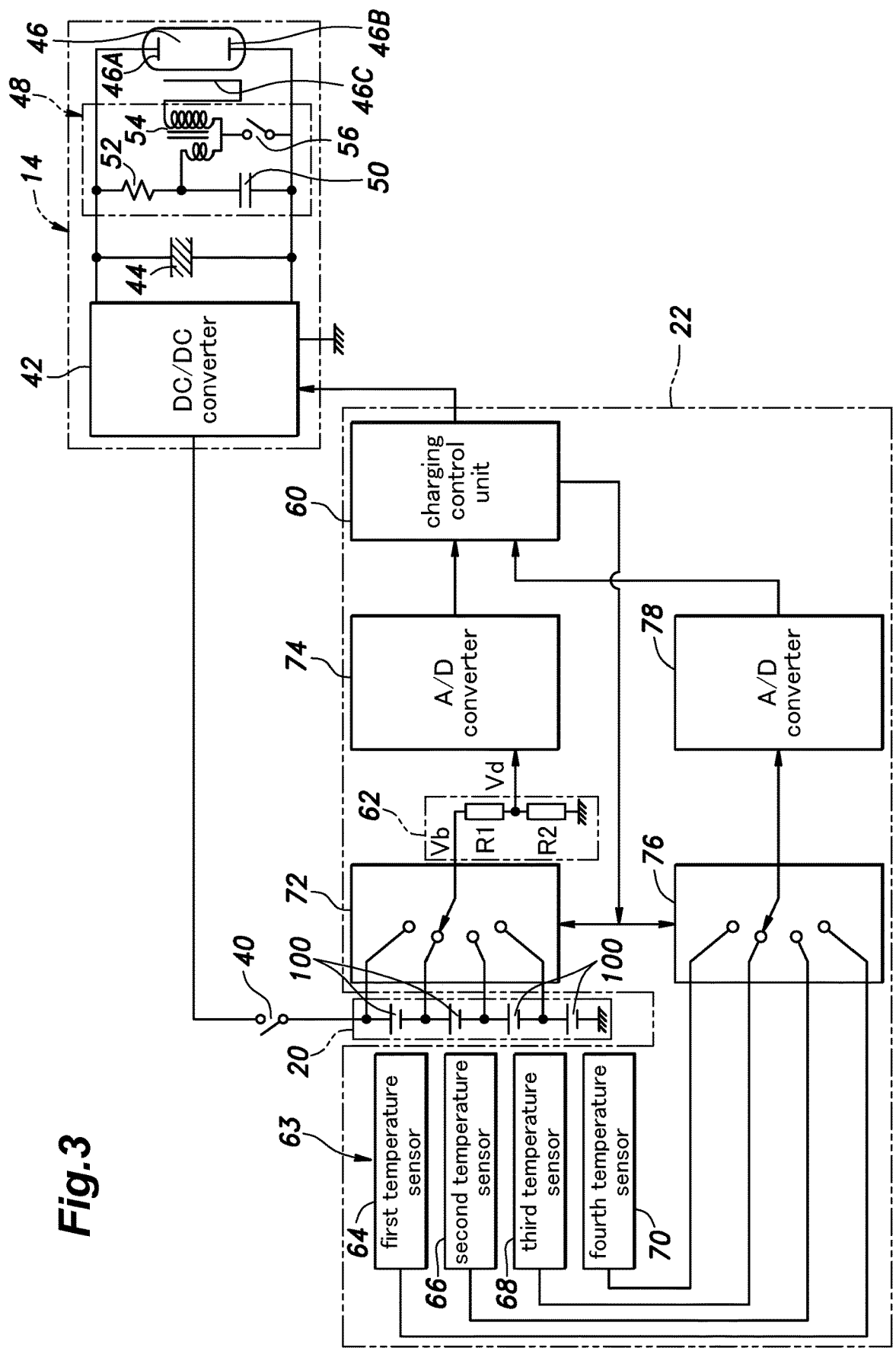
FIG. 3 is a block diagram of an electrical system of the strobe device according to the one embodiment.

As shown in FIG. 3, the flash housing 14 includes a DC/DC converter 42, a main capacitor 44, a xenon discharge tube 46 (flash discharge tube), and a trigger transformer unit 48. The DC/DC converter 42 is supplied with electric power from each battery 100 in the power housing 12 via a power switch 40. The main capacitor 44 is charged by an output of the DC/DC converter 42. The DC/DC converter 42 can change a charging electric current of the main capacitor 44 by an external signal.

The main capacitor 44 is charged by the four batteries 100 via the DC/DC converter 42, and applies a voltage between discharge electrodes 46A and 46B of the xenon discharge tube 46. The four batteries 100 function as a power supply, and are held in the battery case 20 so as to be connected in series. The trigger transformer unit 48 includes a capacitor 50, a resistor 52, a trigger transformer 54, and a synchronous switch 56. The trigger transformer unit 48 applies a trigger voltage to a trigger electrode 46C of the xenon discharge tube 46 by closing the synchronous switch 56. When the trigger voltage is applied to the trigger electrode 46C, the xenon discharge tube 46 generates an electric discharge between the discharge electrodes 46A and 46B so as to flash.

The printed wiring board 22 is provided with a charging control unit 60 and a voltage detecting unit 62 (voltage measuring unit). A first temperature sensor 64, a second temperature sensor 66, a third temperature sensor 68, and a fourth temperature sensor 70, which constitute a temperature detecting unit 63, are mounted on the printed wiring board 22.

The voltage detecting unit 62 includes resistors R1 and R2 that are connected in series. When a selector 72 sequentially selects one battery 100 to be a target of voltage detection, the voltage detecting unit 62 divides a voltage Vb of the selected one battery 100 by the resistors R1 and R2 so as to generate a voltage Vd, and then outputs the voltage Vd to an A/D converter 74. That is, the voltage detecting unit 62 respectively detects the voltage of each battery 100 held in each battery chamber 24 under the operation of the selector 72. The A/D converter 74 performs A/D conversion on information related to the voltage Vd and outputs the converted information to the charging control unit 60.

The first to fourth temperature sensors 64 to 70 are composed of IC temperature sensors and the like mounted on the printed wiring board 22. Each of the first to fourth temperature sensors 64 to 70 includes a temperature sensing portion 64A to 70A (see FIG. 2) abutting against an outer circumferential face of each battery 100 held in each battery chamber 24, and respectively detects a temperature of the outer circumferential face of each battery 100. The first to fourth temperature sensors 64 to 70 are connected to a selector 76. When the selector 76 sequentially selects one of the first to fourth temperature sensors 64 to 70, the selected one of the first to fourth temperature sensors 64 to 70 outputs information related to a temperature of each battery 100 to the A/D converter 78 via the selector 76. The A/D converter 78 performs A/D conversion on the information related to the temperature outputted from the selected one of the first to fourth temperature sensors 64 to 70, and outputs the converted information to the charging control unit 60.

Figure 4:
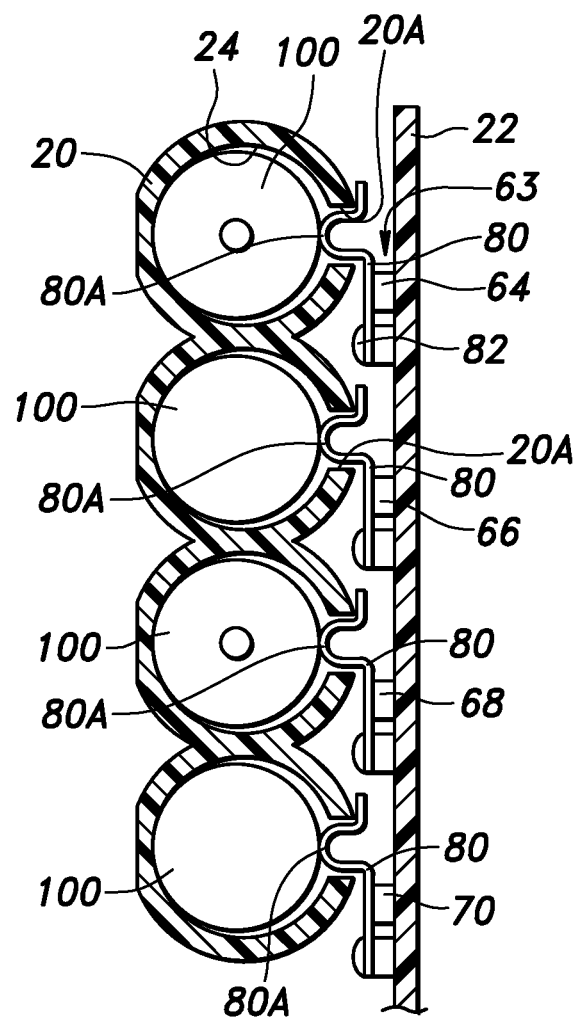
FIG. 4 is a cross sectional view showing a temperature detecting unit of a strobe device according to another embodiment.

As shown in FIG. 4, in another embodiment, the temperature detecting unit 63 may include band-shaped temperature sensing elements 80 corresponding to each of the first to fourth temperature sensors 64 to 70, respectively. Each temperature sensing element 80 has spring property and is attached to the printed wiring board 22 in a cantilever manner by a screw 82. A base side of each temperature sensing element 80 abuts against the corresponding one of the first to fourth temperature sensors 64 to 70 in a thermally conductive state. A protrusion 80A is formed on a free end side of each temperature sensing element 80. The protrusion 80A is received by each battery chamber 24 via an opening 20A provided in the battery case 20 for each battery chamber 24.

The protrusion 80A of each temperature sensing element 80 is pressed against the outer circumferential face of each battery 100 by the spring property of each temperature sensing element 80 itself, and thereby abuts against the outer circumferential face of each battery 100 with high thermal conductivity. Thus, each of the first to fourth temperature sensors 64 to 70 can accurately and reliably detect the temperature of each battery 100.

The charging control unit 60 is an electronic control unit including a CPU and the like. Information related to the voltage (terminal voltage) and the temperature of each battery 100 is inputted to the charging control unit 60 from the voltage detecting unit 62 and the first to fourth temperature sensors 64 to 70 via the A/D converters 74 and 78. Based on this information, the charging control unit 60 controls charging of the main capacitor 44 under the operation of the DC/DC converter 42.

The charging control unit 60 controls the DC/DC converter 42 such that the main capacitor 44 is charged with a first electric current (small electric current) suitable for the lithium batteries, in a case where a total voltage of the four batteries 100 detected by the voltage detecting unit 62 is more than a prescribed first value (for example, 9V) and a difference in the voltage between the batteries 100 is equal to or less than a prescribed value (for example, the voltage of each battery 100 is the same with each other). The charging control unit 60 controls the DC/DC converter 42 such that the main capacitor 44 is charged with a second electric current (large electric current) that is greater than the first electric current, in a case where the total voltage is equal to or less than the first value. Incidentally, each of the first and second electric currents may be a fixed value or a variable value that varies based on a charging amount of each battery 100 and the like.

The batteries 100 may be damaged or different types of batteries 100 may be mixed in a case where the voltage of each battery 100 is not the same with each other.

The total voltage of the four batteries 100 connected in series is 14.8V, which is larger than 9V, provided that all the four batteries 100 are the lithium batteries having substantially the same size as the AA size and the rated voltage of each lithium battery is 3.7V. Accordingly, the charging control unit 60 can accurately and reliably determine, only by measuring (detecting) the voltage of each battery 100, that all the batteries 100 held in the four battery chambers 24 are lithium batteries, in a case where the total voltage of the four batteries 100 is more than 9V and the voltage of each battery 100 is the same with each other.

Further, the charging control unit 60 determines whether the voltages of all the batteries 100 detected by the voltage detecting unit 62 are less than a prescribed second value (for example, 4.2V, which is a overcharge limit voltage of the lithium battery) that is smaller than the first value in the case where the total voltage of the four batteries 100 detected by the voltage detecting unit 62 is more than the first value and the difference in the voltage between the batteries 100 is equal to or less than the prescribed value. The charging control unit 60 controls charging of the main capacitor 44 such that the main capacitor 44 is charged with the first electric current in a case where the voltages of all the batteries 100 are less than the second value. The charging control unit 60 prohibits charging of the main capacitor 44 in a case where the voltage of at least one of the batteries 100 is not less than the second value (that is, in a case where the voltage of at least one of the batteries 100 is equal to or more than the second value).

Further, the charging control unit 60 determines whether the voltages of all the batteries 100 detected by the voltage detecting unit 62 are equal to or more than a prescribed third value (For example, 2.7V, which is an over-discharge limit voltage of the lithium battery) that is smaller than the second value in the case where the total voltage of the four batteries 100 detected by the voltage detecting unit 62 is more than the first value and the difference in the voltage between the batteries 100 is equal to or less than the prescribed value. The charging control unit 60 controls charging of the main capacitor 44 such that the main capacitor 44 is charged with the first electric current in a case where the voltages of all the batteries 100 are equal to or more than the third value. The charging control unit 60 prohibits charging of the main capacitor 44 in a case where the voltage of at least one of the batteries 100 is not equal to or more than the third value (that is, in a case where the voltage of at least one of the batteries 100 is less than the third value).

That is, when all the batteries 100 held in the battery chambers 24 are composed of the lithium batteries, the main capacitor 44 is charged by the lithium batteries on condition that the voltages of all the batteries 100 are not less than the over-discharge limit voltage of the lithium battery and not equal to or more than the overcharge limit voltage thereof. Otherwise, charging of the main capacitor 44 by the lithium batteries is prohibited.

Accordingly, it is possible to prevent the main capacitor 44 from being charged by the lithium battery that is in an over-discharged state or an overcharged state, so that the lithium battery can be used safely. Incidentally, a warning may be displayed by turning on a red LED and the like, in a case where charging of the main capacitor 44 is prohibited due to an over-discharge or an overcharge of the lithium battery.

Further, the charging control unit 60 determines whether the temperatures of all the batteries 100 detected by the first to fourth temperature sensors 64 to 70 are equal to or less than a prescribed temperature (for example, 45° C.). The charging control unit 60 allows charging of the main capacitor 44 in a case where the temperatures of all the batteries 100 are equal to or less than the prescribed temperature. The charging control unit 60 prohibits charging of the main capacitor 44 in a case where the temperature of at least one of the batteries 100 is not equal to or less than the prescribed temperature.

Thereby, it is possible to prevent the temperatures of the batteries 100 from rising in a state where the temperature of at least one of the batteries 100 rises near the temperature at which the battery 100 becomes overheated, since charging of the main capacitor 44 is prohibited. Accordingly, it is possible to prevent the main capacitor 44 from being charged by the battery 100 at a temperature inappropriate for charging the main capacitor 44 and therefore to prevent the battery 100 from being overheated. Incidentally, the warning may be displayed by turning on the red LED and the like, in a case where charging of the main capacitor 44 is prohibited due to the above-mentioned temperature rise of the batteries 100.

Each battery 100 held in each battery chamber 24 may be composed of the nickel-metal hydride battery or the alkaline battery in the AA size in a case where the total voltage of the four batteries 100 detected by the voltage detecting unit 62 is equal to or less than 9V. The charging electric current of the main capacitor 44 in this case is larger than that of the main capacitor 44 in a case where the total voltage of the four batteries 100 is more than 9V (in a case where each battery 100 is composed of the lithium battery).

Thus, in a case where the nickel-metal hydride battery or the alkaline battery is used, the main capacitor 44 can be charged in a time suitable for the characteristic of these batteries.

The lithium battery and the nickel-metal hydride battery or the alkaline battery may be mixed, in a case where the total voltage of the four batteries 100 detected by the voltage detecting unit 62 is more than 9V. If the main capacitor 44 is charged with a large electric current in such a state, the temperature of the lithium battery may rise. In order to prevent the temperature of the lithium battery from rising, charging of the main capacitor 44 is prohibited (stopped) under the above-mentioned temperature monitoring of each battery 100. Thereby, even when the lithium battery and the nickel-metal hydride battery or the alkaline battery are mixed, the batteries 100 can be used safely.

Figure 5:
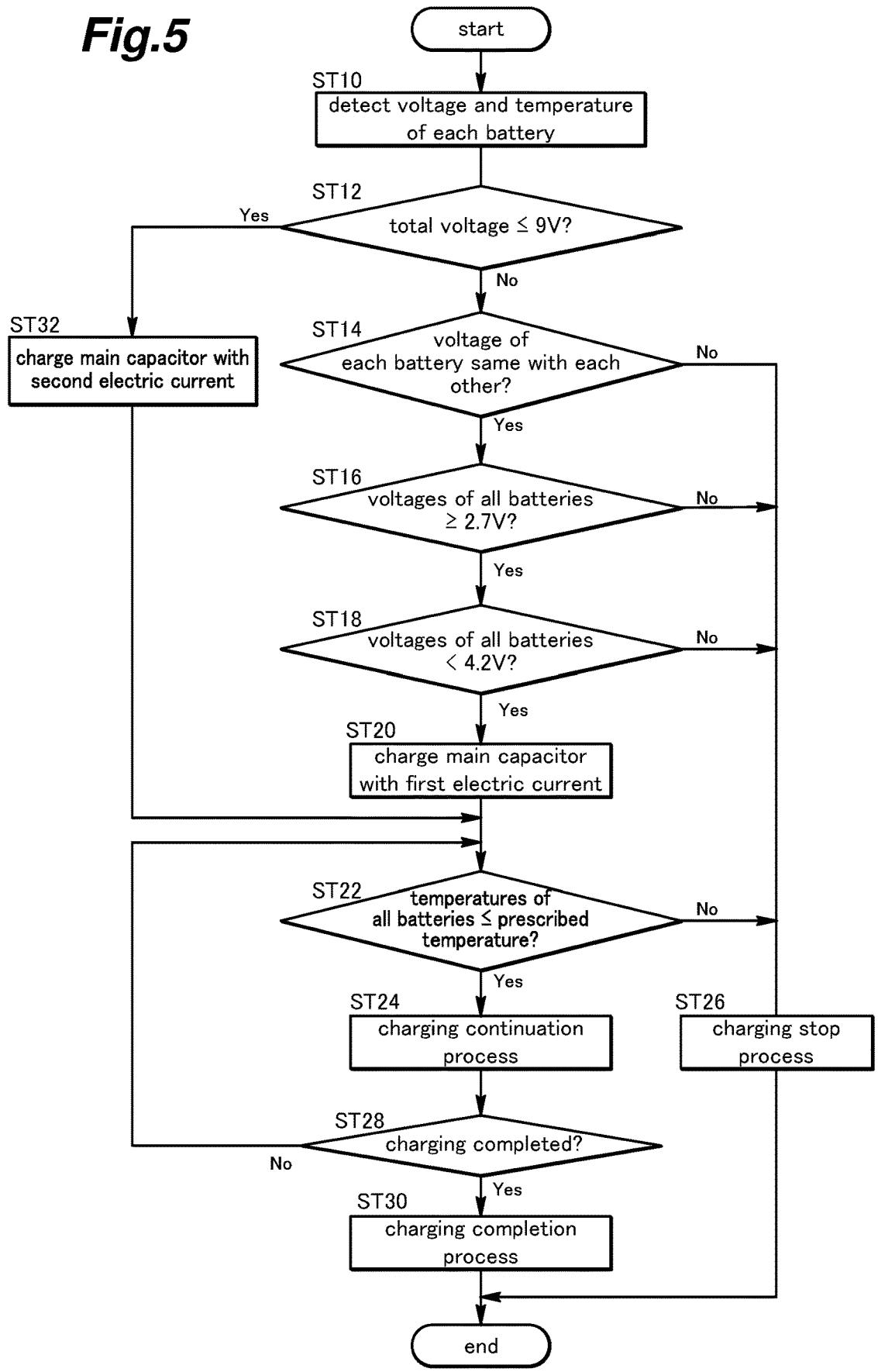
FIG. 5 is a flow chart showing capacitor charging control of the strobe device according to the one embodiment.

Next, capacitor charging control by the charging control unit 60 will be described with reference to FIG. 5. The capacitor charging control may be performed every time charging of the main capacitor 44 is started.

First, the voltage detecting unit 62 detects the voltage of each battery 100 held in each battery chamber 24, respectively. Further, the first to fourth temperature sensors 64 to 70 detect the temperature of each battery 100, respectively (step ST10).

Next, the charging control unit 60 determines whether the total voltage of the four batteries 100 is equal to or less than 9V (step ST12). In a case where the charging control unit 60 determines that the total voltage of the four batteries 100 is not equal to or less than 9V ("No" in step ST12), the charging control unit 60 determines whether the voltage of each battery 100 is the same with each other (step ST14). In a case where the charging control unit 60 determines that the voltage of each battery 100 is not the same with each other ("No" in step ST14), the charging control unit 60 performs a charging stop process of the main capacitor 44 to prohibit charging of the main capacitor 44 (step ST26). In this charging stop process of the main capacitor 44, the above-mentioned warning may be displayed.

In a case where the charging control unit 60 determines that the voltage of each battery 100 is the same with each other ("Yes" in step ST14), the charging control unit 60 can estimate that all the batteries 100 held in the battery chambers 24 are the lithium batteries. In this case, the charging control unit 60 determines whether the voltages of all the batteries 100 are equal to or more than 2.7V (the over-discharge limit voltage of the lithium battery) (step ST16). In a case where the charging control unit 60 determines that the voltages of all the batteries 100 are not equal to or more than 2.7V, in other words, in a case where the charging control unit 60 determines that the voltage of at least one battery 100 is not equal to or more than 2.7V ("No" in step ST16), the charging control unit 60 performs the charging stop process of the main capacitor 44 to prohibit charging of the main capacitor 44 (step ST26). Accordingly, it is possible to prevent the main capacitor 44 from being charged by the battery 100 in the over-discharged state, so that the lithium battery can be used safely.

Next, in a case where the charging control unit 60 determines that the voltages of all the batteries 100 are equal to or more than 2.7V ("Yes" in step ST16), the charging control unit 60 determines whether the voltages of all the batteries 100 are less than 4.2V (the overcharge limit voltage of the lithium battery) (step ST18). In a case where the charging control unit 60 determines that the voltages of all the batteries 100 are not less than 4.2V, in other words, in a case where the charging control unit 60 determines that the voltage of at least one battery 100 is not less than 4.2V ("No" in step ST18), the charging control unit 60 performs the charging stop process of the main capacitor 44 to prohibit charging of the main capacitor 44 (step ST26). Accordingly, the lithium battery can be used safely.

Next, in a case where the charging control unit 60 determines that the voltages of all the batteries 100 are less than 4.2V ("Yes" in step ST18), the charging control unit 60 controls charging of the main capacitor 44 such that the main capacitor 44 is charged with the first electric current (small electric current) suitable for the lithium batteries (step ST20).

Next, the charging control unit 60 determines whether the temperatures of all the batteries 100 are equal to or less than the prescribed temperature (45° C.) (step ST22).

In a case where the charging control unit 60 determines that the temperatures of all the batteries 100 are not equal to or less than the prescribed temperature, in other words, in a case where the charging control unit 60 determines that the temperature of at least one battery 100 is not equal to or less than the prescribed temperature ("No" in step ST22), the charging control unit 60 performs the charging stop process of the main capacitor 44 to prohibit charging of the main capacitor 44 (step ST26). Accordingly, the lithium battery can be used safely.

In a case where the charging control unit 60 determines that the temperatures of all the batteries 100 are equal to or less than the prescribed temperature ("Yes" in step ST22), the charging control unit 60 performs a charging continuation process of the main capacitor 44 to continue charging of the main capacitor 44 with a current electric current (step ST24). Next, the charging control unit 60 determines whether charging of the main capacitor 44 is completed (step ST28). In a case where the charging control unit 60 determines that charging of the main capacitor 44 is completed ("Yes" in step ST28), the charging control unit 60 performs a charging completion process of the main capacitor 44 in which charging of the main capacitor 44 may be stopped (step ST30). In the charging completion process, a charging completion of the main capacitor 44 may be displayed.

In a case where the charging control unit 60 determines that charging of the main capacitor 44 is not completed ("No" in step ST28), the charging control unit 60 returns to step ST22 to repeat temperature monitoring of each battery 100.

In a case where the charging control unit 60 determines that the total voltage of the four batteries 100 is equal to or less than 9V ("Yes" in step ST12), the charging control unit 60 can estimate that all of the batteries 100 held in the battery chambers 24 are the nickel-metal hydride batteries or the alkaline batteries, or that these batteries are mixed with the lithium batteries. In this case, the charging control unit 60 controls charging of the main capacitor 44 such that the main capacitor 44 is charged with the second electric current (large electric current) (step ST32).

Thereafter, the charging control unit 60 proceeds to step ST22 to perform the temperature monitoring of each battery 100. In a case where the lithium battery, which is different from the nickel-metal hydride battery and the alkaline battery, is contained in the four batteries 100, the temperature of the lithium battery rises relatively rapidly, and the temperature of the lithium battery becomes not equal to or less than the prescribed temperature. Accordingly, the determination in step ST22 becomes "No" and the charging control unit 60 performs the charging stop process of the main capacitor 44 to prohibit charging of the main capacitor 44 (step ST26). Accordingly, the batteries 100 can be used safely, even when the nickel-metal hydride batteries or the alkaline batteries are mixed with the lithium batteries.

Concrete embodiments of the present invention have been described in the foregoing, but the present invention should not be limited by the foregoing embodiments and various modifications and alterations are possible within the scope of the present invention. For example, the number of the batteries 100 held in the battery case 20 is not limited to four, and may be any plural number other than four. The size of the batteries 100 held in the battery case 20 is not limited to the AA size, and may be any size other than the AA size. Also, not all of the component parts shown in the foregoing embodiment are necessarily indispensable, and they may be selectively used as appropriate without departing from the scope of the present invention.

The invention claimed is:

1. A strobe device comprising:
   a battery case configured to hold a plurality of batteries formed in a substantially same size in a replaceable manner;
   a main capacitor configured to be charged by the batteries;
   a flash discharge tube to which a voltage is applied by the main capacitor; a voltage detecting unit configured to detect a voltage of each of the batteries, respectively; and
   a charging control unit configured to
   control charging of the main capacitor such that the main capacitor is charged with a first electric current that is suitable for lithium batteries in a case where a total voltage of the batteries detected by the voltage detecting unit is more than a prescribed first value and a difference in the voltage between the batteries is equal to or less than a prescribed value, and
   control charging of the main capacitor such that the main capacitor is charged with a second electric current that is greater than the first electric current in a case where the total voltage is equal to or less than the first value.

2. The strobe device according to claim 1, wherein the charging control unit is configured to
   control charging of the main capacitor such that the main capacitor is charged with the first electric current in a case where the total voltage is more than the first value, the difference in the voltage between the batteries is equal to or less than the prescribed value, and the voltages of all the batteries detected by the voltage detecting unit are less than a prescribed second value that is smaller than the first value, and
   prohibit charging of the main capacitor in a case where the total voltage is more than the first value and the voltage of at least one of the batteries detected by the voltage detecting unit is not less than the second value.

3. The strobe device according to claim 2, wherein the charging control unit is configured to
   control charging of the main capacitor such that the main capacitor is charged with the first electric current in a case where the total voltage is more than the first value, the difference in the voltage between the batteries is equal to or less than the prescribed value, and the voltages of all the batteries detected by the voltage detecting unit are equal to or more than a prescribed third value that is smaller than the second value, and
   prohibit charging of the main capacitor in a case where the total voltage is more than the first value and the voltage of at least one of the batteries detected by the voltage detecting unit is not equal to or more than the third value.

4. The strobe device according to claim 1, further comprising a temperature detecting unit configured to detect a temperature of each of the batteries, respectively, wherein the charging control unit is configured to
   allow charging of the main capacitor in a case where the temperatures of all the batteries detected by the temperature detecting unit are equal to or less than a prescribed temperature, and prohibit charging of the main capacitor in a case where the temperature of at least one of the batteries detected by the temperature detecting unit is not equal to or less than the prescribed temperature.

5. The strobe device according to claim 4, further comprising a printed circuit board provided with the voltage detecting unit and the charging control unit, wherein temperature sensors that constitute the temperature detecting unit are mounted on the printed circuit board for each of the batteries held by the battery case.

6. The strobe device according to claim 4, further comprising a printed circuit board provided with the voltage detecting unit and the charging control unit, wherein the temperature detecting unit includes:

temperature sensors mounted on the printed circuit board for each of the batteries held by the battery case; and temperature sensing elements corresponding to each of the temperature sensors and abutting against an outer circumferential face of each of the batteries.

7. The strobe device according to claim 1, wherein the batteries to be held in the battery case include the lithium batteries, nickel-metal hydride batteries, and alkaline batteries.

8. The strobe device according to claim 1, wherein the charging control unit is configured to prohibit charging of the main capacitor in a case where the total voltage is more than the first value and the difference in the voltage between the batteries is more than the prescribed value.

9. A charging control method for a strobe device that includes a battery case configured to hold a plurality of batteries formed in a substantially same size in a replaceable manner, a main capacitor charged by the batteries, and a flash discharge tube to which a voltage is applied by the main capacitor, the charging control method comprising steps of:

detecting a voltage of each of the batteries, respectively; and charging the main capacitor with a first electric current that is suitable for lithium batteries in a case where a total voltage of the batteries is more than a prescribed first value and a difference in the voltage between the batteries is equal to or less than a prescribed value, and charging the main capacitor with a second electric current that is greater than the first electric current in a case where the total voltage is equal to or less than the first value.

* * * * *